(12) United States Patent
Adkins et al.

(10) Patent No.: US 6,660,996 B1
(45) Date of Patent: Dec. 9, 2003

(54) SYSTEM AND METHOD FOR EXAMINING RELATIONSHIP BETWEEN INTERSECTING ENCODER OUTPUT SIGNALS

(75) Inventors: Christopher Alan Adkins, Lexington, KY (US); Lucas David Barkley, Lexington, KY (US); Michael Anthony Marra, III, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 209 days.

(21) Appl. No.: 09/898,356

(22) Filed: Jul. 3, 2001

(51) Int. Cl.[7] .................................................. G01D 5/34
(52) U.S. Cl. ..................... 250/231.13; 341/13
(58) Field of Search ...................... 250/231.13–231.18; 356/614–619; 341/13

(56) References Cited

U.S. PATENT DOCUMENTS

| | | | |
|---|---|---|---|
| 4,224,515 A | 9/1980 | Terrell | |
| 4,259,570 A | 3/1981 | Leonard | |
| 4,491,826 A | 1/1985 | Krogh et al. | |
| 4,529,964 A | * 7/1985 | Minami et al. | ............... 341/13 |
| 4,547,667 A | 10/1985 | Sasaki et al. | |
| 4,606,008 A | 8/1986 | Wason | |
| 4,678,910 A | 7/1987 | Hara et al. | |
| 4,682,343 A | 7/1987 | Pfiffner | |
| 4,751,383 A | 6/1988 | Ueyama | |
| 5,129,725 A | 7/1992 | Ishizuka et al. | |
| 5,260,769 A | 11/1993 | Ieki et al. | |
| 5,414,516 A | 5/1995 | Morishita et al. | |
| 5,572,018 A | 11/1996 | Taniguchi et al. | |
| 5,750,984 A | 5/1998 | Ieki | |
| 5,774,068 A | 6/1998 | Seki | |
| 5,939,714 A | 8/1999 | Park | |
| 5,981,942 A | 11/1999 | Ieki | |
| 6,043,771 A | 3/2000 | Clark et al. | |
| 6,087,654 A | 7/2000 | Durham, III | |
| 6,175,109 B1 | 1/2001 | Setbacken et al. | |
| 6,355,927 B1 | * 3/2002 | Snyder | .................. 250/231.13 |

* cited by examiner

*Primary Examiner*—Thanh X. Luu
(74) *Attorney, Agent, or Firm*—Michael J. Nieberding

(57) ABSTRACT

An encoder system may determine a plurality of intersection points for first and second encoder output signals produced by an encoder. Each intersection point may be determined by initiating a capture of sample points of each of the encoder signals and then examining the captured sample points.

27 Claims, 8 Drawing Sheets

SYSTEM AND METHOD FOR EXAMINING RELATIONSHIP BETWEEN INTERSECTING ENCODER OUTPUT SIGNALS

TECHNICAL FIELD

The present invention relates generally to encoder systems used for tracking movement of mechanical structures and, more particularly, to a system and method for analyzing encoder output signals for information regarding phase and amplitude relationship of the signals.

BACKGROUND OF THE INVENTION

A large number of different encoder systems have been used in the past. A typical encoder outputs two different signals on different channels. In an ideal situation the encoder output signals are in quadrature (90° out of phase with each other) and have the same amplitude and period. Amplitudes of the two encoder output signals repeatedly intersect. Different techniques have been used to determine when the encoder output signals are not exactly 90° out of phase and/or when the max to min amplitudes of the signals do not match.

It would be advantageous to provide a system and method useful in considering the phase and amplitude relationship between two encoder output signals.

SUMMARY OF THE INVENTION

In one aspect, a method for determining an intersection point between first and second encoder output signals involves: (a) defining a capture start position; (b) determining when an amplitude of the second encoder output signal crosses the capture start position; (c) after step (b), initiating capture of a plurality of first sample points of the first encoder output signal and a plurality of second sample points of the second encoder output signal; (d) storing the captured first and second sample points; and (e) examining the stored first and second sample points to define the intersection point.

In another aspect, a method of examining phase and amplitude relationship between first and second encoder output signals which are out of phase and which repeatedly intersect involves: (a) determining a first intersection point between the first and second encoder output signals when the first encoder output signal is increasing and the second encoder output signal is decreasing; (b) determining a second intersection point between the first encoder output signal and an inverse of the second encoder output signal when the first encoder output signal is increasing and the second encoder output signal is increasing; (c) determining a third intersection point between the first and second encoder output signals when the first encoder output signal is decreasing and the second encoder output signal is increasing; and (d) determining a fourth intersection point between the first encoder output signal and an inverse of the second encoder output signal when the first encoder output signal is decreasing and the second encoder output signal is decreasing.

In a further aspect, an encoder signal analysis system for examining first and second encoder output signals includes a controller receiving the first and second encoder output signals. The controller determines: (i) a first intersection point between the first and second encoder output signals when the first encoder output signal is increasing and the second encoder output signal is decreasing, (ii) a second intersection point between the first encoder output signal and an inverse of the second encoder output signal when the first encoder output signal is increasing and the second encoder output signal is increasing, (iii) a third intersection point between the first and second encoder output signals when the first encoder output signal is decreasing and the second encoder output signal is increasing, and (iv) a fourth intersection point between the first encoder output signal and an inverse of the second encoder output signal when the first encoder output signal is decreasing and the second encoder output signal is decreasing.

In still a further aspect, an encoder signal analysis system for determining a intersection point between first and second encoder output signals includes a controller receiving the first and second encoder output signals. The controller includes a stored capture start position. The controller determines when an amplitude of the second encoder output signal crosses the capture start position and then initiates capture of a plurality of first sample points of the first encoder output signal and a plurality of second sample points of the second encoder output signal. The controller stores the captured first and second sample points and examines the stored first and second sample points to define the intersection point.

DETAILED DESCRIPTION

Figure 1:
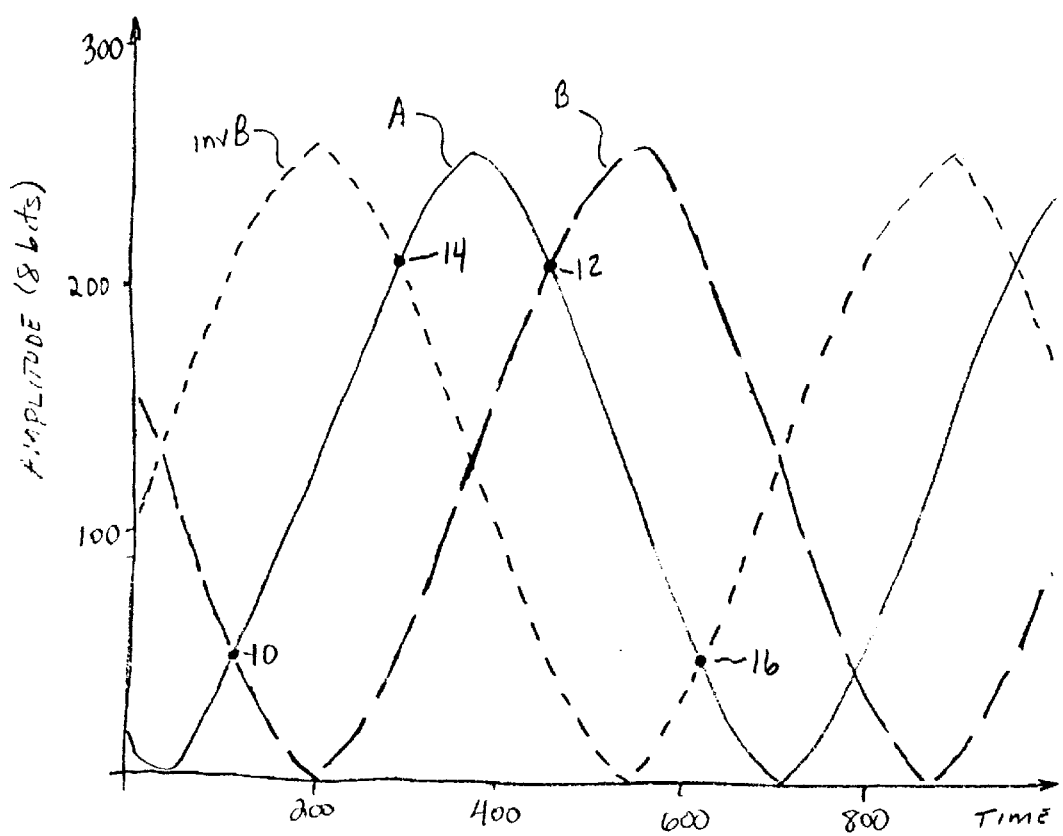
FIG. 1 is a graph of encoder output signals.

Referring to FIG. 1, typical analog encoder output signals A and B are shown, along with an inverted B signal invB. The A and B signals repeatedly intersect as shown at 10 and 12, and the A signal and the inverse B signal repeatedly intersect as shown at 14 and 16. Where the A and B signals are ideal (exactly 90° out of phase, with max to min amplitudes of the A and B signals the same and DC offsets the same) the intersection point 10 will occur at the same amplitude as intersection point 16, and the intersection point 12 will occur at the same amplitude as intersection point 14. However, as the encoder output signals A and B are rarely if ever ideal, a need arises to determine phase and amplitude errors between the two signals. One technique for doing so is to actually determine where each of the intersection points 10, 12, 14 and 16 actually occur. By knowing the actual intersection points, or approximations thereof, the phase and amplitude error between the encoder output signals A and B can be calculated.

Figure 2:
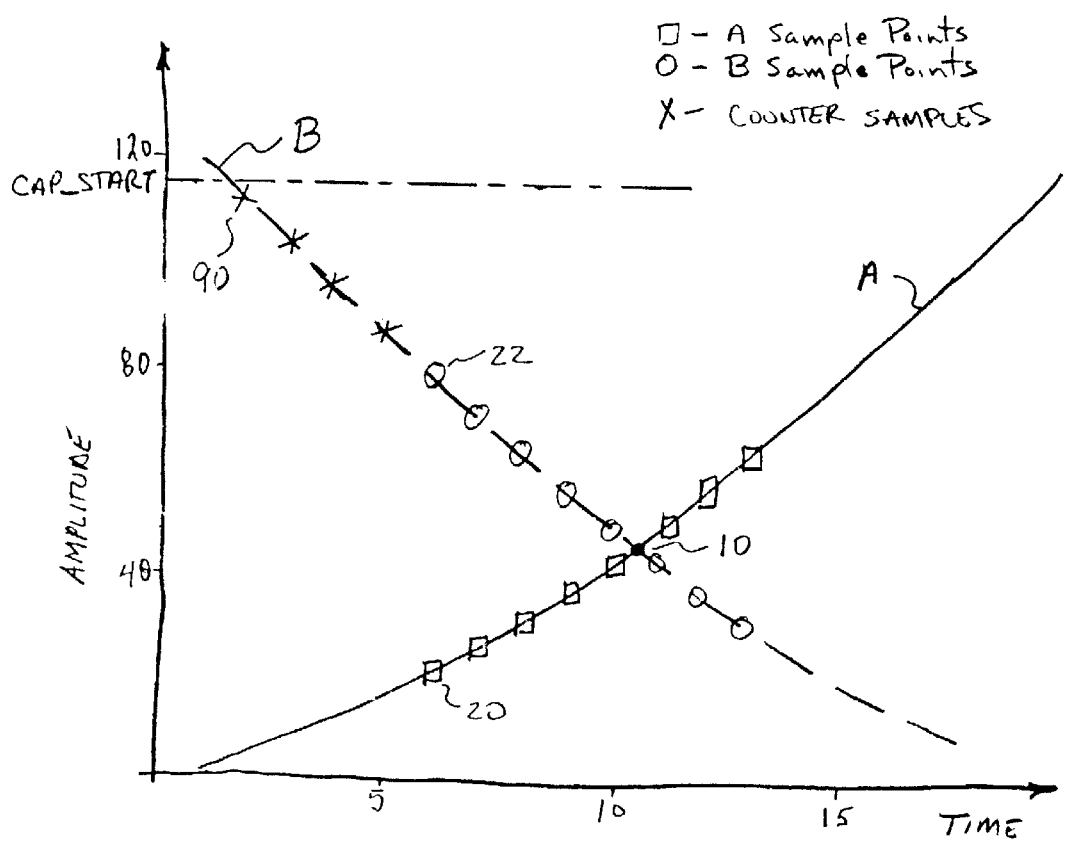
FIG. 2 is an enlarged view of one intersection point of FIG. 1.

Referring to FIG. 2 which illustrates an enlarged graph of the A and B signals around intersection point 10, in one embodiment, a method for determining the intersection point 10 between encoder output signals A and B involves defining a capture start position CAP_START. The capture start position represents an amplitude near which the intersection point 10 which is to be determined is thought to be. One of the A and B signals is used as a trigger signal (the B signal in FIG. 2) and after a determination is made that an amplitude of the trigger signal crosses the capture start position in a specified direction, capture of a plurality of A sample points 20 of the A signal and a plurality of B sample points 22 of the B signal is initiated. The captured sample points are stored and examined to define the amplitude of intersection point 10. The method may involve switching back and forth between capture and storage of a B sample point 22, then an A sample point 20, then another B sample point, then another A sample point etc. until the desired number of sample points (in this example 8) of each signal are captured and stored. The A and B sample points may be stored as pairs of points, with each pair made up of one A sample point and one B sample point.

Any number of techniques can be used to define the amplitude of the intersection point 10 based upon the captured A and B sample points 20 and 22. In one embodiment one of the captured sample points 20 and 22 may be selected as the amplitude of the intersection point 10. For example, in FIG. 2 the last captured B sample point 22 on the trigger signal B which is greater than its corresponding A sample point can be selected or the first captured A sample point which is less than its corresponding B sample point can be selected. An interpolation or other calculation scheme could also be used to more accurately define the intersection point 10. Regardless of the exact technique used, the defined intersection point can be stored for later use in evaluating the phase and amplitude relation ship of the A and B encoder signals. Further, for any given intersection point being determined, the above method can be repeated multiple times in order to be sure that the eventually defined intersection point is acceptable.

If all captured B sample points are greater than all captured A sample points, the method can be repeated by defining a lower capture start position and then repeating the sample point capture when the trigger signal crosses the new capture start position. If all captured B sample points are less than all captured A sample points, the method can be repeated by defining a higher capture start position and then repeating the sample point capture when the trigger signal crosses the new capture start position.

Figure 3:
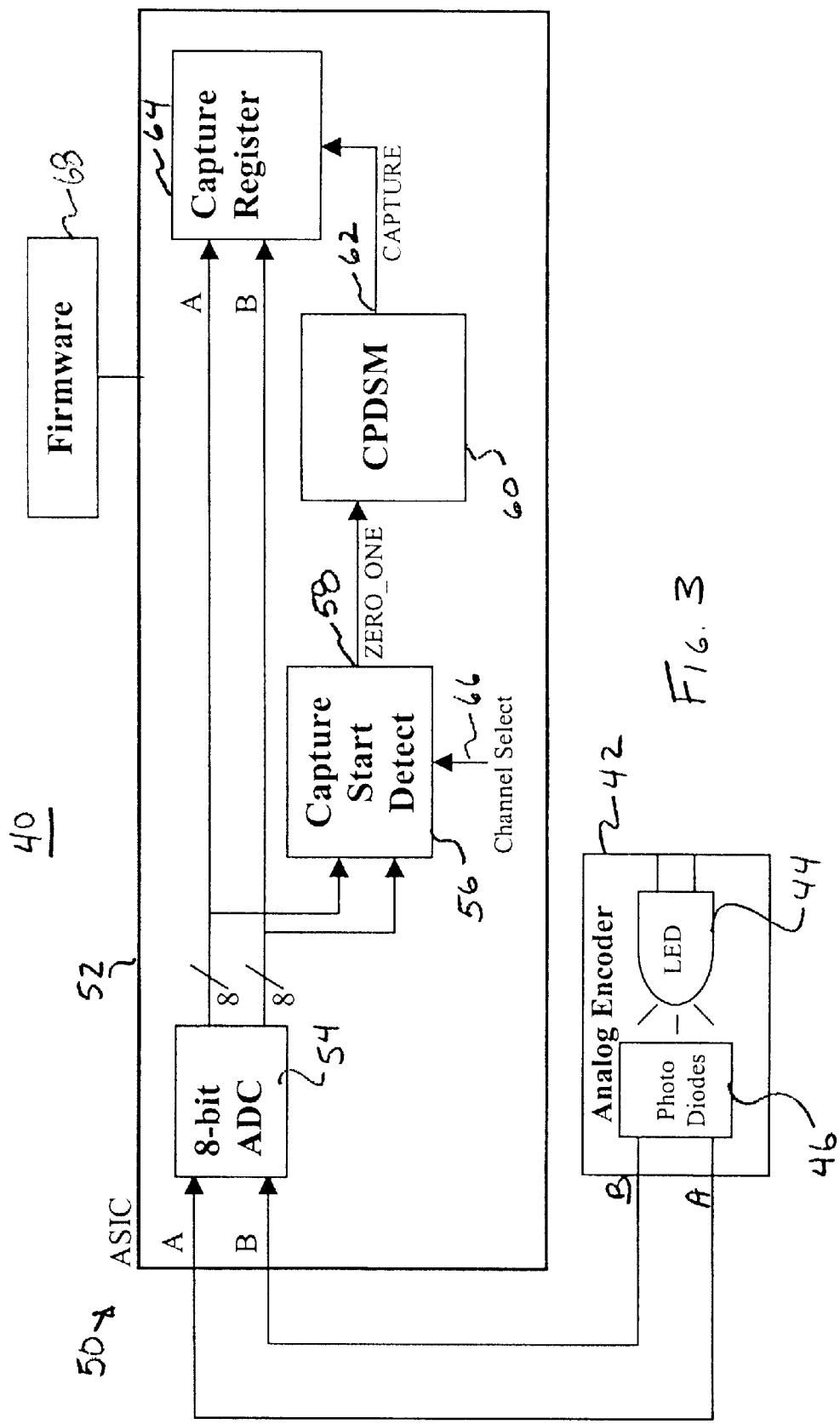
FIG. 3 is a schematic view of one embodiment of an encoder system.

An exemplary system 40 in which the foregoing method may be conducted is illustrated in FIG. 3. The system includes an analog encoder 42 including a light element 44 such as an LED and photo sensors 46 which may take the form of photo diodes. In the case of a rotary encoder a rotating, windowed mask may be positioned between the light element 44 and photo sensors 46. In the case of a linear encoder the light element 44 and photo sensors 46 may move relative to a fixed, windowed encoder mask strip. The encoder 42 includes A and B outputs providing the A and B output signals to a controller 50. The encoder 42 may include gain control circuitry (not shown) associated with each of the A and B channels. The controller implements the movement monitoring methods. In the illustrated embodiment the controller 50 includes an ASIC 52 with an A/D converter 54 receiving the analog A and B signals of the encoder 42. The A/D converter 54 outputs the converted A and B signals to a capture start detect circuit 56 which in turn includes a crossover trigger signal output 58 (ZERO_ONE) to a crossover or intersection point state machine 60. The A/D converter may be set for desired point averaging such as 8 or 16. The state machine 60 includes the output 62 for initiating capture and storage of sample points by the capture register block 64. The capture start detect block 56 includes an input 66 to control which of the A and B signals is examined by the circuit 56. This input 66 may be provided by firmware 68. As shown, the capture register block 64 also receives the converted A and B signals output by the A/D converter 54.

Firmware 68 or other code forming a part of the controller 50 sets parameters for determining a given intersection point and examines the captured sample points stored in registers of block 64. In particular, and referring now to Table I below, in one embodiment the parameters set by the firmware for a given intersection determination sequence include a crossover soft reset bit "SOFT_RESET", a crossover start acquisition bit "START", a crossover channel select bit "CHAN_SELECT", a crossover up/down select bit "CROSS_UP/DN", a capture start position defined by an 8 bit word "CAP_START", and a crossover filter count defined by an 8 bit word "CROSS_FILT_CNT".

TABLE I

| CONTROL PARAMETERS | |
| --- | --- |
| Control Field | Width (bits) |
| SOFT_RESET | 1 |
| START | 1 |
| CHAN_SELECT | 1 |
| CROSS_UP/DN | 1 |
| CAP_START | 8 |
| CROSS_FILT_CNT | 8 |

Figure 4:
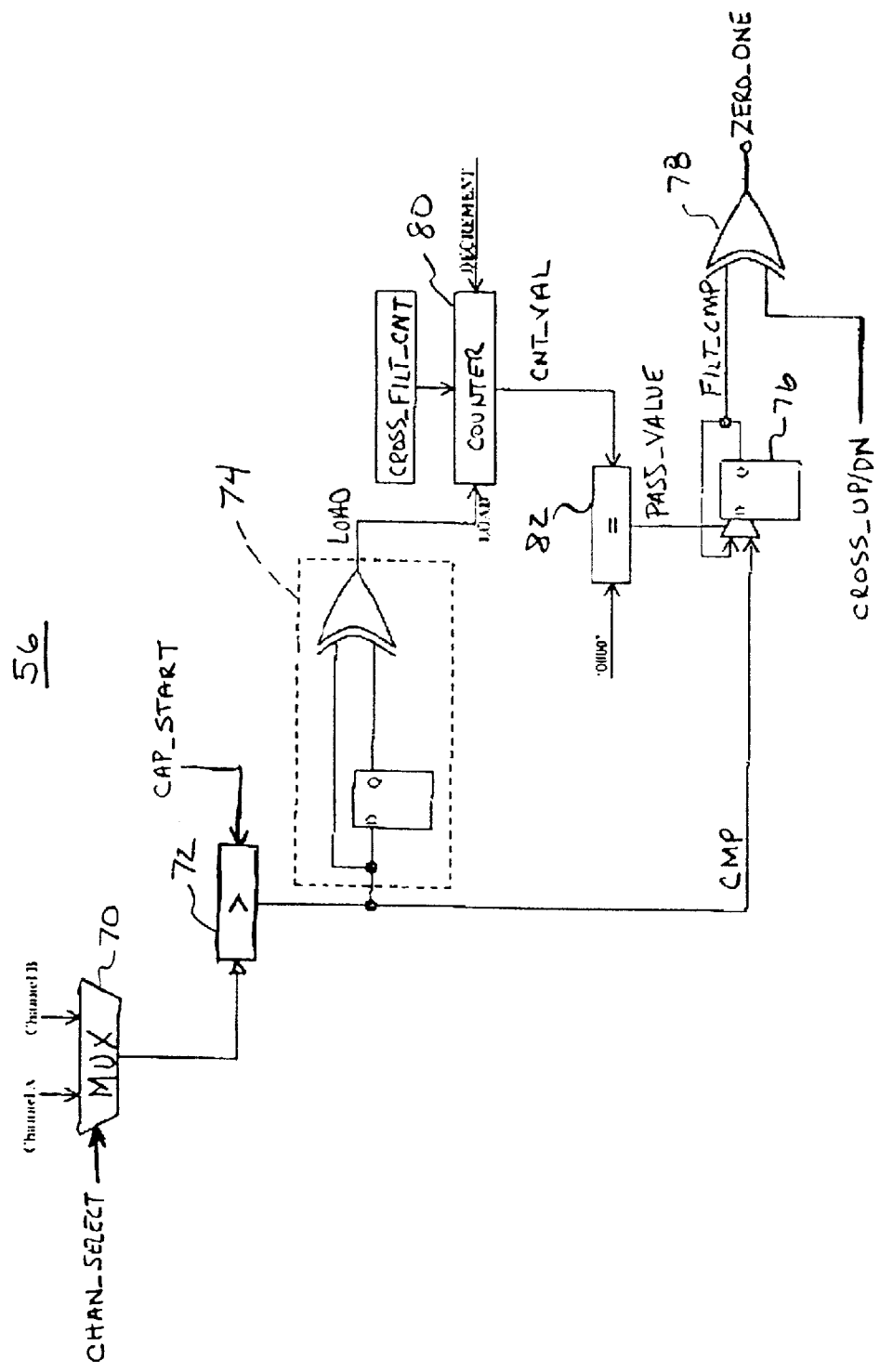
FIG. 4 is circuit diagram of the capture start detect circuit of FIG. 3.

These parameters are used to control the operation of the capture start detect circuit 56 and the state machine 60. In particular, referring to FIG. 4 which illustrates an embodiment of the capture start detect circuit 56, the converted A and B signals output by the A/D converter are received by a multiplexer 70 which is controlled by the CHAN_SELECT bit. A comparator 72 receives the signal value passed by the multiplexer 70 and compares it to the CAP_START value. If the signal value is greater than the CAP_START value the CMP output of the comparator is set high, otherwise the CMP output is set low. The CMP output is delivered to a D flip-flop 76 having an output FILT_CMP. The FILT_CMP output in combination with the CROSS_UP/DN bit are input to X-OR 78 to produce output ZERO_ONE. The CROSS_UP/DN bit controls whether a given intersection point determination sequence looks for a positive to negative or negative to positive crossover of the capture start position value CAP_START. A change in CMP does not trigger an immediate change in FILT_CMP or ZERO_ONE. In particular, the pre-existing FILT_CMP value continues to be passed by the flip-flop 76 until the PASS_VALUE control line is temporarily set high to cause the CMP input to be passed by the flip-flop 76. The CMP output is also passed to a change detection module 74 which temporarily sets its LOAD output high when a change in state of the CMP output occurs. The high LOAD output triggers counter 80 to load the CROSS_FILT_CNT value. Each time the A/D converter loads a new value onto the output for the channel being monitored (as set by CHAN_SELECT) the counter 76 decrements its count value CNT_VAL which is output to a comparator 82. When the count value CNT_VAL reaches zero the comparator sets its PASS_VALUE output temporarily high to cause the CMP output to be passed by the flip-flop 76.

In this arrangement, upon initiation of an intersection point determining sequence, the ZERO_ONE output maintains a low output state until two conditions occur. First, a change in state must occur at the CMP output of the comparator 72, indicating that the signal being monitored (e.g. the trigger signal) has crossed the defined capture start position CAP_START. Second, a plural number of samples of the trigger signal must be output by the A/D converter, the plural number being defined by the CROSS_FILT_CNT value. This arrangement accounts for possible noise in the system and assures that the trigger signal has in fact crossed over the CAP_START value before a capture sequence begins. Implementations which do not require condition 2 above are contemplated as within the scope of the invention.

Figure 5:
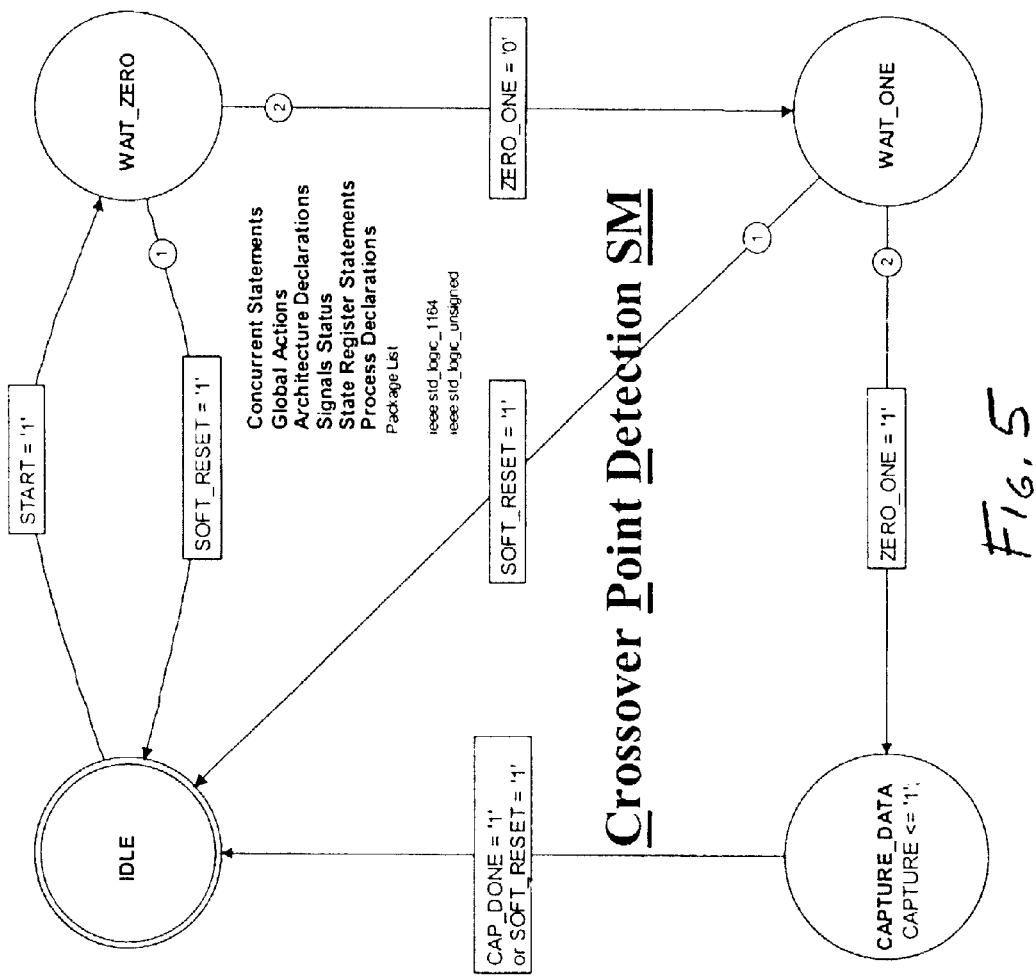
FIG. 5 is a state diagram for the state machine of FIG. 3.

Referring now to FIG. 5, a state diagram for state machine 60 is shown, including an IDLE state, a WAIT ZERO state, a WAIT_ONE state, and a CAPTURE DATA state. In the IDLE state, state machine 60 waits for the START bit to be set to 1 by the firmware to initiate an intersection point determination sequence by moving to the WAIT ZERO state. From the WAIT ZERO state the state machine 60 moves to the WAIT_ONE state only when the ZERO_ONE output is set low indicating that the trigger signal is on the correct side, either above or below for a given case, of the capture start position or value CAP_START. From the WAIT_ONE state the state machine 60 moves to the CAPTURE DATA state when the ZERO_ONE output of the capture start detect circuit 56 goes high indicating that the trigger signal has crossed the defined capture start position CAP_START. In the CAPTURE DATA state the state machine sets a CAPTURE bit high to cause the capture register block 64 to capture sample points of the A and B signals. The controller samples both the A and B signals a plurality of times and loads the A and B sample points into registers of block 64. As previously mentioned, the state machine may first capture and load an A sample point, then a B sample point, then an A sample point and so on until the desired number of sample points of each of the A and B signals is stored. The desired number may be 8 as shown in the example of FIG. 2, but could be other numbers as well. The A and B sample points are related as pairs of sample points, with each pair made up of one A sample point and one B sample point captured back to back. When the state machine 60 completes the sample point capture, it sets an interrupt output CAP_DONE high to trigger the firmware 68 to examine the stored A and B sample points and determine the intersection point and to cause the state machine 60 to move back to the IDLE state. In any of the WAIT ZERO state, the WAIT_ONE state and the CAPTURE DATA state a move back to the IDLE state may be triggered if the firmware re-asserts/sets high the SOFT_RESET bit.

The intersection point determination sequence may be initiated by the firmware 68 as desired. In a printer application, for example, the sequence may be initiated each time the printer is turned on, as part of an initialization sequence or less often, such as after so many hours of printer on time or after so many printed pages. When the sequence is initiated, all four intersection points 10, 12, 14 and 16 may typically be determined. Example intersection point determining sequences for each of points 10, 12, 14 and 16 are shown in FIGS. 2, 6, 7 and 8 respectively.

Referring again to the example of FIG. 2, the firmware 70 sets parameters as follows: CAP_START=115, CROSS_FLT_CNT=3, CHAN_SEL=1 (channel B), CROSS_UP/DN=1 (up to down). When the START bit is set high the sequence is initiated. Once the B signal crosses CAP_START, counter samples 90 cause the counter 80 in circuit 56 to decrement 4 times (3, 2, 1, 0) and then the A sample points 20 and B sample points 22 are captured and stored in register 64. Exemplary sample points are shown in TABLE II below.

TABLE II

| FIG. 2 SAMPLE POINTS | |
|---|---|
| CHA | CHB |
| 20 | 78 |
| 25 | 71 |
| 31 | 63 |
| 37 | 56 |
| 43 | 49 |
| 49 | 42 |
| 56 | 36 |
| 64 | 30 |

The firmware 68 then analyzes the captured sample points. If each B sample point is less than each A sample point, CAP_START is increased and the capture sequence is performed again. If each B sample point is greater than each A sample point, CAP_START is decreased and the capture sequence is performed again. If there is a crossover between the A and B sample points, the firmware 68 defines the intersection point 10. The firmware 68 may thereafter initiate a determining sequence for intersection point 12.

Figure 6:
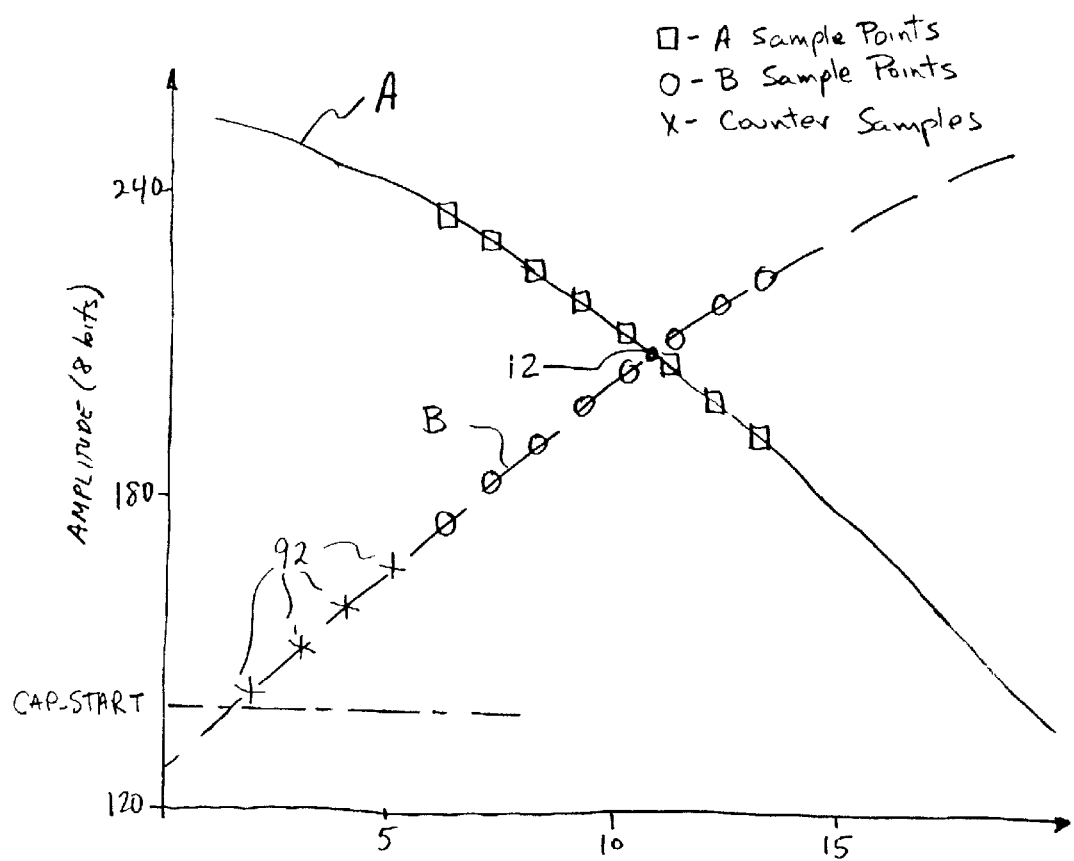
FIG. 6 is an enlarged view of one intersection point of FIG. 1.

Referring to FIG. 6, the firmware 68 sets the parameters as follows: CAP_START=140, CROSS_FLT_CNT=3, CHAN_SEL=1 (channel B), CROSS_UP/DN=1 (down to up). When the START bit is set high the sequence is initiated. Once the B signal crosses CAP_START, counter samples 92 cause the counter 80 in circuit 56 to decrement 4 times (3, 2, 1, 0) and then the A sample points and B sample points are captured and stored in register 64. Exemplary sample points are shown in TABLE III below.

TABLE III

| FIG. 6 SAMPLE POINTS | |
|---|---|
| CHA | CHB |
| 236 | 173 |
| 231 | 181 |
| 225 | 189 |
| 220 | 196 |
| 213 | 203 |
| 207 | 210 |
| 200 | 216 |
| 193 | 222 |

The firmware 68 then analyzes the captured sample points. If each B sample point is less than each A sample point, CAP_START is increased and the capture sequence is performed again. If each B sample point is greater than each A sample point, CAP_START is decreased and the capture sequence is performed again. If there is a crossover between the A and B sample points, the firmware 68 defines the intersection point 12. The firmware 68 may thereafter initiate a determining sequence for intersection point 14.

Figure 7:
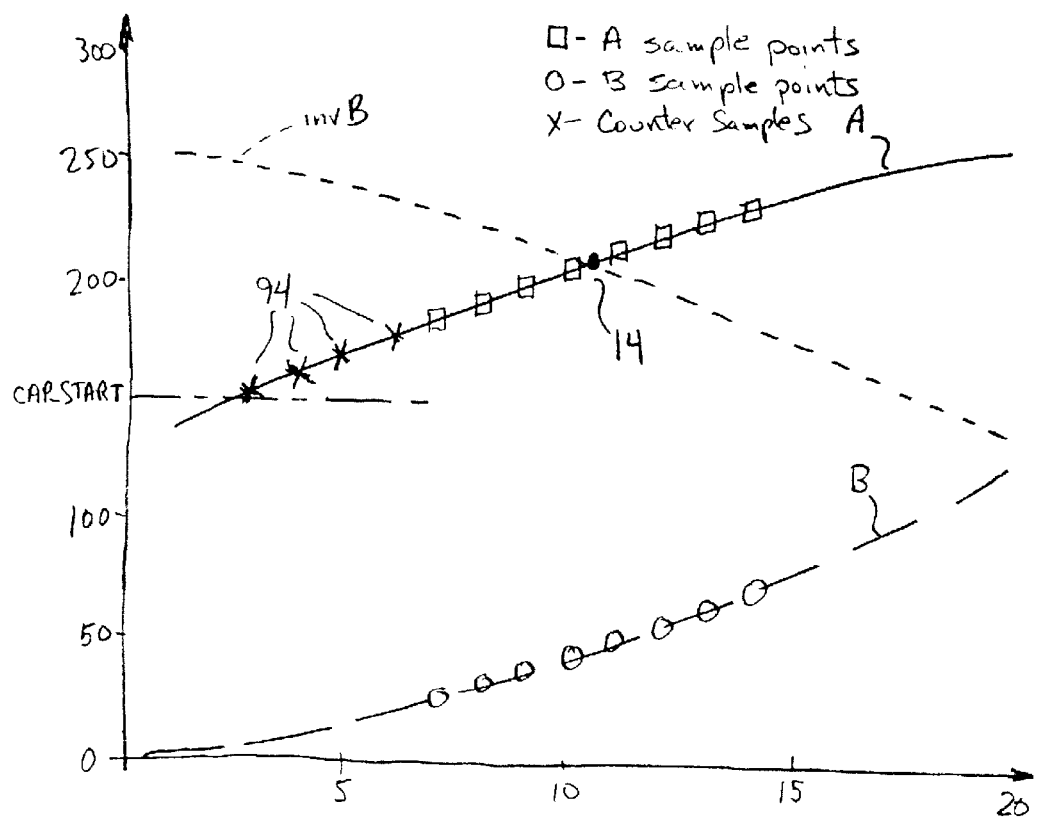
FIG. 7 is an enlarged view of one intersection point of FIG. 1.

Referring to FIG. 7, the A and B signals are shown along with a representation of the inverted B signal invB. The firmware 68 sets the parameters as follows: CAP_START=140, CROSS_FLT_CNT=3, CHAN_SEL=0 (channel A), CROSS_UP/DN=1 (down to up). When the START bit is set high the sequence is initiated. Once the A signal crosses CAP_START, counter samples 94 cause the counter 80 in circuit 56 to decrement 4 times (3, 2, 1, 0) and then the A sample points and B sample points are captured and stored in register 64. Exemplary sample points are shown in TABLE IV below. Also shown are corresponding values for the inverted B signal invB as determined by subtracting the value of the B sample point from the maximum amplitude of the B signal Max(B), in this case 255.

TABLE IV

FIG. 7 SAMPLE POINTS

| CHA | CHB | Max(B)-CHB |
|---|---|---|
| 186 | 25 | 230 |
| 193 | 31 | 224 |
| 200 | 37 | 218 |
| 207 | 43 | 212 |
| 214 | 50 | 205 |
| 220 | 57 | 198 |
| 226 | 64 | 191 |
| 231 | 71 | 184 |

The firmware 68 then analyzes the captured sample points. If the inverted value of each B sample point is less than each A sample point, CAP_START is decreased and the capture sequence is performed again. If the inverted value of each B sample point is greater than each A sample point, CAP_START is increased and the capture sequence is performed again. If there is a crossover between the A sample points and the inverted values of the B sample points, the firmware 68 defines the intersection point 14. The firmware 68 may thereafter initiate a determining sequence for intersection point 16.

Figure 8:
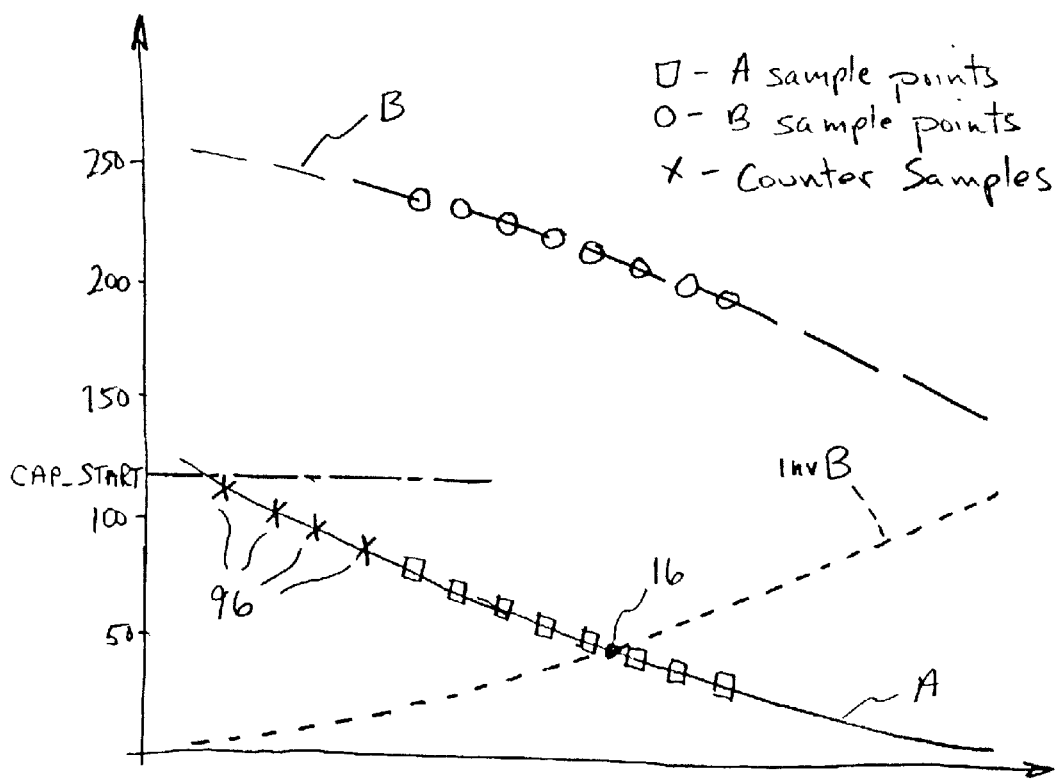
FIG. 8 is an enlarged view of one intersection point of FIG. 1.

Referring mow to FIG. 8, the A and B signals are shown along with a representation of the inverted B signal invB. The firmware 68 sets the parameters as follows: CAP_START=120, CROSS_FLT_CNT =3, CHAN_SEL =0 (channel A), CROSS_UP/DN=1 (up to down). When the START bit is set high the sequence is initiated. Once the A signal crosses CAP_START, counter samples 96 cause the counter 80 in circuit 56 to decrement 4 times (3, 2, 1, 0) and then the A sample points and B sample points are captured and stored in register 64. Exemplary sample points are shown in TABLE IV below. Also shown are corresponding values for the inverted B signal invB as determined by subtracting the value of the B sample point from the maximum amplitude of the B signal Max(B), in this case 255.

TABLE IV

FIG. 8 SAMPLE POINTS

| CHA | CHB | Max(B)-CHB |
|---|---|---|
| 79 | 235 | 20 |
| 71 | 231 | 24 |
| 63 | 225 | 30 |
| 56 | 219 | 36 |
| 49 | 213 | 42 |
| 43 | 207 | 48 |
| 36 | 200 | 55 |
| 30 | 193 | 62 |

The firmware 68 then analyzes the captured sample points. If the inverted value of each B sample point is less than each A sample point, CAP_START is decreased and the capture sequence is performed again. If the inverted value of each B sample point is greater than each A sample point, CAP_START is increased and the capture sequence is performed again. If there is a crossover between the A sample points and the inverted values of the B sample points, the firmware 68 defines the intersection point 16.

Although the invention has been described above in detail referencing the preferred embodiments thereof, it is recognized that various changes and modifications could be made without departing from the spirit and scope of the invention.

What is claimed is:

1. A method for determining an intersection point between first and second encoder output signals, the method comprising the steps of:
   (a) defining a capture start amplitude;
   (b) determining when an amplitude of the second encoder output signal crosses the capture start amplitude;
   (c) after step (b), initiating capture of a plurality of first sample points of the first encoder output signal and a plurality of second sample points of the second encoder output signal;
   (d) storing the captured first and second sample points; and
   (e) examining the stored first and second sample points to define the intersection point.

2. The method of claim 1 wherein step (b) involves counting a plural number of sample points of the second encoder output signal after an indication that the capture start amplitude as been crossed.

3. The method of claim 2, comprising the further step of:
   (f) defining a desired direction of crossing the capture start amplitude.

4. The method of claim 2 wherein the plural number is defined by a stored value.

5. The method of claim 1 wherein, prior to step (e), a determination is made as to whether all stored first sample points are above all stored second sample points and, if so, steps (a), (b), (c) and (d) are repeated and in repeated step (a) a new capture start amplitude is defined.

6. The method of claim 1 wherein, prior to step (e), a determination is made as to whether all stored first sample points are below all stored second sample points and, if so, steps (a), (b), (c) and (d) are repeated and in repeated step (a) a new capture start amplitude is defined.

7. The method of claim 1 wherein step (e) involves selecting one of the stored first sample points or stored second sample points as the defined intersection point.

8. The method or claim 7 wherein the first encoder output signal leads the second encoder output signal, during step (c) the first encoder output signal is decreasing and the second encoder output signal is increasing, in step (d) the first sample points and second sample points are related as pairs of points, each pair comprised by one first sample point and one second sample point, the intersection point being an upper intersection point, and step (e) involves selecting one of (i) a last captured second sample point which is below its paired first sample point and (ii) a first captured first sample point which is below its paired second sample point.

9. The method of claim 7 wherein the first encoder output signal leads the second encoder output signal, during step (c) the first encoder output signal is increasing and the second encoder output signal is decreasing, in step (d) the first sample points and second sample points are related as pairs of points, each pair comprised by one first sample point and one second sample point, the intersection point being a lower intersection point, and step (e) involves selecting one of (i) a last captured second sample point which is above its paired first sample point and (ii) a first captured first sample point which is above its paired second sample point.

10. The method of claim 1 wherein the first encoder output signal leads the second encoder output signal.

11. The method of claim 1 wherein step (c) involves calculating the intersection point based upon at least one first sample point and one second sample point.

12. The method of claim 11 wherein an interpolation scheme is used in step (c).

13. The method of claim 1 comprising the further step of storing the defined intersection point of step (c).

14. The method of claim 1 wherein during step (c) the first encoder output signal is increasing and the second encoder output signal is decreasing.

15. The method of claim 1 wherein during step (c) the first encoder output signal is increasing and the second encoder output signal is increasing.

16. A method of examining phase and amplitude relationship between first and second encoder output signals which are out of phase and which repeatedly intersect, the method comprising the steps of:

(a) determining an amplitude of a first intersection point between the first and second encoder output signals when the first encoder output signal is increasing and the second encoder output signal is decreasing;

(b) determining an amplitude of a second intersection point between the first encoder output signal and all inverse of the second encoder output signal when the first encoder output signal is increasing and the second encoder output signal is increasing;

(c) determining an amplitude of a third intersection point between the first and second encoder output signals when the first encoder output signal is decreasing and the second encoder output signal is increasing;

(d) determining an amplitude of a fourth intersection point between the first encoder output signal and the inverse of the second encoder output signal when the first encoder output signal is decreasing and the second encoder output signal is decreasing.

17. The method of claim 16 wherein each of the determined amplitudes of the first, second, third and fourth intersection points is stored.

18. The method of claim 16 wherein each of steps (a), (b), (c) and (d) involves the sub-steps of: (i) capturing a plurality of first sample points of the first encoder output signal and a plurality of second sample points of the second encoder output signal, (ii) storing the capture first and second sample points, and (iii) examining the stored first and second sample points to define the intersection point amplitude being determined.

19. The method of claim 18 wherein in each of steps (a), (b), (c) and (d) sub-step (i) is initiated by determining that one of the first and second encoder output signals has crossed an established capture start amplitude.

20. The method of claim 19 wherein determining that one of the first and second encoder output signals has crossed the established capture start position amplitude involves counting a plural number of sample points after an indication that the established capture start amplitude has been crossed.

21. The method of claim 18 wherein in each of steps (a), (b), (c) and (d) sub-step (iii) involves selecting one of the stored first sample points or stored second sample points as the defined intersection point amplitude.

22. An encoder signal analysis system for examining first and second encoder output signals, the system comprising:

a controller receiving the first and second encoder output signals, the controller determining: (i) an amplitude of a first intersection point between the first and second encoder output signals when the first encoder output signal is increasing and the second encoder output signal is decreasing, (ii) an amplitude of a second intersection point between the first encoder output signal and an inverse of the second encoder output signal when the first encoder output signal is increasing and the second encoder output signal is increasing, (iii) an amplitude of a third intersection point between the first and second encoder output signals when the first encoder output signal is decreasing and the second encoder output signal is increasing, and (iv) an amplitude of a fourth intersection point between the first encoder output signal and the inverse of the second encoder output signal when the first encoder output signal is decreasing and the second encoder output signal is decreasing.

23. The system of claim 22 wherein the controller stores the amplitudes of the first, second, third and fourth intersection points.

24. The system of claim 22 wherein the controller determines the amplitude of each of the first, second, third and fourth intersection points in accordance with the following steps: (i) capturing a plurality of first sample points of the first encoder output signal and a plurality of second sample points of the second encoder output signal, (ii) storing the captured first and second sample points, amid (iii) examining the stored first and second sample points to define the intersection point amplitude being determined.

25. The system of claim 24 wherein the controller includes an analog to digital converter receiving the first and second encoder output signals, a capture start detect circuit receiving outputs of the analog to digital converter, a state machine for initiating capture in response to an output of the capture start detect circuit, a capture register for storing captured first and second sample points, and code for examining the stored first and second sample points.

26. An encoder signal analysis system for determining a intersection point between first and second encoder output signals, the system comprising:

a controller receiving the first and second encoder output signals, the controller including a stored capture start amplitude, the controller: (a) determining when an amplitude of the second encoder output signal crosses the capture start amplitude; (b) after step (a), initiating capture of a plurality of first sample points of the first encoder output signal and a plurality of second sample points of the second encoder output signal; (c) storing the captured first and second sample points; and (d) examining the stored first and second sample points to define the intersection point.

27. The system of claim 26 wherein tile controller includes an analog to digital converter receiving the first and second encoder output signals, a capture start detect circuit receiving outputs of the analog to digital converter, a state machine for initiating capture in response to an output of the capture start detect circuit for examining the stored first and second sample points.

* * * * *